(12) United States Patent
Anderson, Jr.

(10) Patent No.: US 8,911,207 B1
(45) Date of Patent: Dec. 16, 2014

(54) DEPLOYMENT DEVICE AND SYSTEM FOR HYDROKINETIC ENERGY CONVERTER TURBINE

(71) Applicant: Winfield Scott Anderson, Jr., Palm Beach Gardens, FL (US)

(72) Inventor: Winfield Scott Anderson, Jr., Palm Beach Gardens, FL (US)

( * ) Notice: Subject to any disclaimer, the term of this patent is extended or adjusted under 35 U.S.C. 154(b) by 0 days.

(21) Appl. No.: 14/085,175

(22) Filed: Nov. 20, 2013

(51) Int. Cl.
*F03B 13/10* (2006.01)
*F03B 3/12* (2006.01)

(52) U.S. Cl.
CPC .................................. *F03B 3/12* (2013.01)
USPC ............................................. 416/85; 416/142

(58) Field of Classification Search
CPC ........... F05B 2240/93; F05B 2240/931; F05B 2240/932; F05B 2240/9152; F05B 2240/90; F03B 17/061; Y02E 10/226
USPC ............................................................ 416/85
See application file for complete search history.

(56) References Cited

U.S. PATENT DOCUMENTS 5,651,706 A * 7/1997 Kasper ............................ 440/29

FOREIGN PATENT DOCUMENTS

WO    WO2012044267    *    4/2012    .............. F03B 13/10

* cited by examiner

*Primary Examiner* — Edward Look
*Assistant Examiner* — Jeffrey A Brownson
(74) *Attorney, Agent, or Firm* — Akerman LLP; Mark D. Passler

(57) ABSTRACT

A deployment device and system for a hydrokinetic energy converter such as a hydrokinetic turbine that can be coupled to a generator to produce electricity. The deployment device can include a floatable platform including a central aperture sized to allow a hydrokinetic turbine to be lowered therethrough into water. A pair of deployment swing members are rotatably attached to the platform and located adjacent to the central aperture. Each deployment swing member has a support for connection to an end of a hydrokinetic turbine. Each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water.

17 Claims, 10 Drawing Sheets

DEPLOYMENT DEVICE AND SYSTEM FOR HYDROKINETIC ENERGY CONVERTER TURBINE

FIELD OF THE INVENTION

The present application relates to a deployment device and system for a hydrokinetic energy converter, and particularly to a deployment device and system for a hydrokinetic turbine that can be coupled by hydraulic circuits to a generator to produce electricity from flowing water.

BACKGROUND

Generally, four types of hydrokinetic devices have been tested in recent years. These are: horizontal axis turbines, vertical axis turbines, oscillating hydrofoils and a Venturi system where water is accelerated through a "choke system" to create a pressure drop that can be used to drive turbines. One example of a vertical helical turbine generator is known from U.S. Pat. No. 6,036,443 to Gorlov. Gorlov discloses a vertically oriented helical turbine which includes helical airfoil-shaped blades that are arranged in a spiral about a central shaft. The helical arrangement allows the turbine generator to be used in multidirectional fluid flows. An array of the turbines can be provided to increase power output. U.S. Pat. No. 4,384,212 to Lapeyre discloses a horizontally mounted helical turbine that is used on the surface to translate surface wave energy into electrical energy. Another surface mounted helical generator is disclosed in U.S. Pat. No. 2,154,397 to Cook.

Significant issues can be caused by known devices to marine life, which can be harmed by the rotating turbine blades. Various proposals to reduce the damage to marine life include encasing the turbine blades in a wire mesh cage, which adds to the expense of the installation and only act to protect larger animals such as turtles from coming into contact with the blades. However, the cages do nothing to prevent smaller fish from being harmed. Additionally, many proposed turbine blades can suffer damage from water-borne debris, and even shipping. Due to these problems, acceptance of hydrokinetic devices by local communities and environmentally aware groups has not been as strong as hoped for, and the reliability of the devices has been limited.

Most previous hydrokinetic generation proposals additionally involve providing a rigid housing or anchoring system to retain the generator. This can be prohibitively expensive, as it can involve anchoring installations, and also the installation of energy supply cabling and pipes. Additionally, once installed, there is typically not much flexibility to allow the turbines to move with different water flows. Various proposals exist to ameliorate these difficulties, including U.S. Pat. No. 4,849,647 to McKenzie discloses a floating helical turbine which is connected to a tether line by a flexible ball joint. U.S. Pat. No. 4,708,592 to Krolick et al. discloses a non-rigid helicoidal wind turbine that uses a flexible fabric sheet to form the helix, and which can be tethered to existing mast structures using swivel joints.

For the foregoing reasons, none of the suggested hydrokinetic energy devices have been successful in practice. Thus, there remains a need for an hydrokinetic energy generator that is efficient, can work in a variety of water flow situations possibly including an ice/water mix, and which does not harm marine life.

The present inventor has suggested exemplary arrangements of a hydrokinetic turbine that can be used in a hydrokinetic energy converter, and specifically to a helical auger turbine with an associated hydrokinetic generator. These auger turbines are described in U.S. Pat. Nos. 7,728,454; 7,938,622; 8,152,464; and 8,282,352, the entire contents of which are incorporated herein by reference. While the described turbines have been successful in practice, the launching of the turbines and the securing of the turbines into place in tidal water proved difficult, particularly when the turbine is made of a lightweight material or when there is insufficient ability to anchor or support both ends of the turbines.

SUMMARY

In accordance with one aspect of the exemplary embodiments, a deployment device and system for a hydrokinetic energy converter is disclosed, and particularly a deployment device for a tapered helical auger turbine that can be coupled by hydraulic circuits to a generator to produce electricity from flowing water.

A deployment device and system for a hydrokinetic energy converter such as a hydrokinetic turbine that can be coupled to a generator to produce electricity. The deployment device can include a floatable platform including a central aperture sized to allow a hydrokinetic turbine to be lowered therethrough into water. A pair of deployment swing members are rotatably attached to the platform and located adjacent to the central aperture. Each deployment swing member has a support for connection to an end of a hydrokinetic turbine. Each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water.

The disclosed deployment device, system and method can be used either as a permanent installation, or purely for deployment purposes. Rigid deployment swing members allow the turbine to be moved into position without the water flow causing issues with alignment of the turbine.

The above-described and other features and advantages of the present disclosure will be appreciated and understood by those skilled in the art from the following detailed description, drawings, and appended claims.

DETAILED DESCRIPTION OF THE INVENTION

The exemplary arrangements of the present disclosure are described with respect to a hydrokinetic turbine that can be used in a hydrokinetic energy converter, specifically one that can be used in a tidal flow or river flow. Suitable hydrokinetic turbines are described in U.S. Pat. Nos. 7,728,454; 7,938,622; 8,152,464; and 8,282,352, the entire contents of which are incorporated herein by reference.

Figure 1:
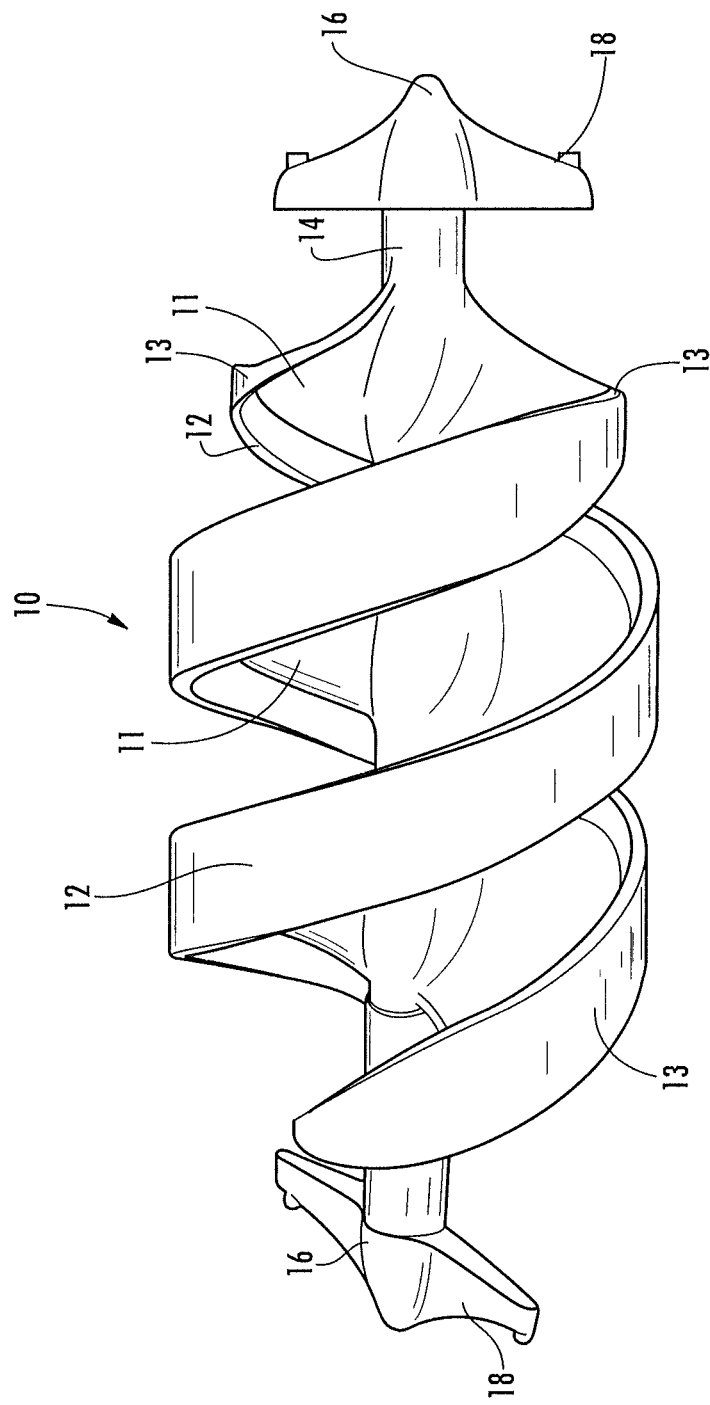
FIG. 1 is a perspective view of a hydrokinetic turbine to be deployed by the deployment system.
Figure 2:
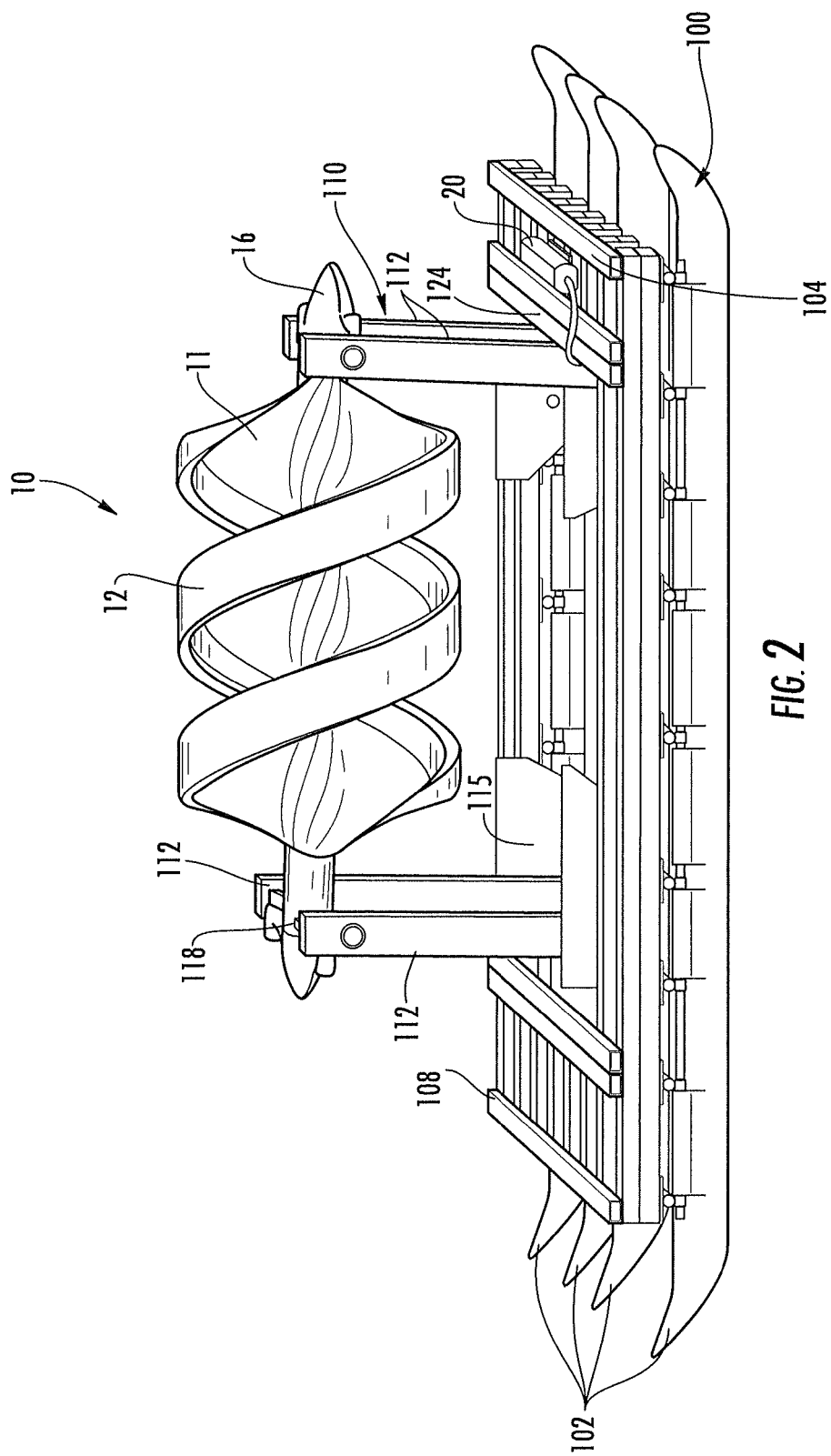
FIG. 2 is a perspective view of a deployment system and attached hydrokinetic turbine.
Figure 3:
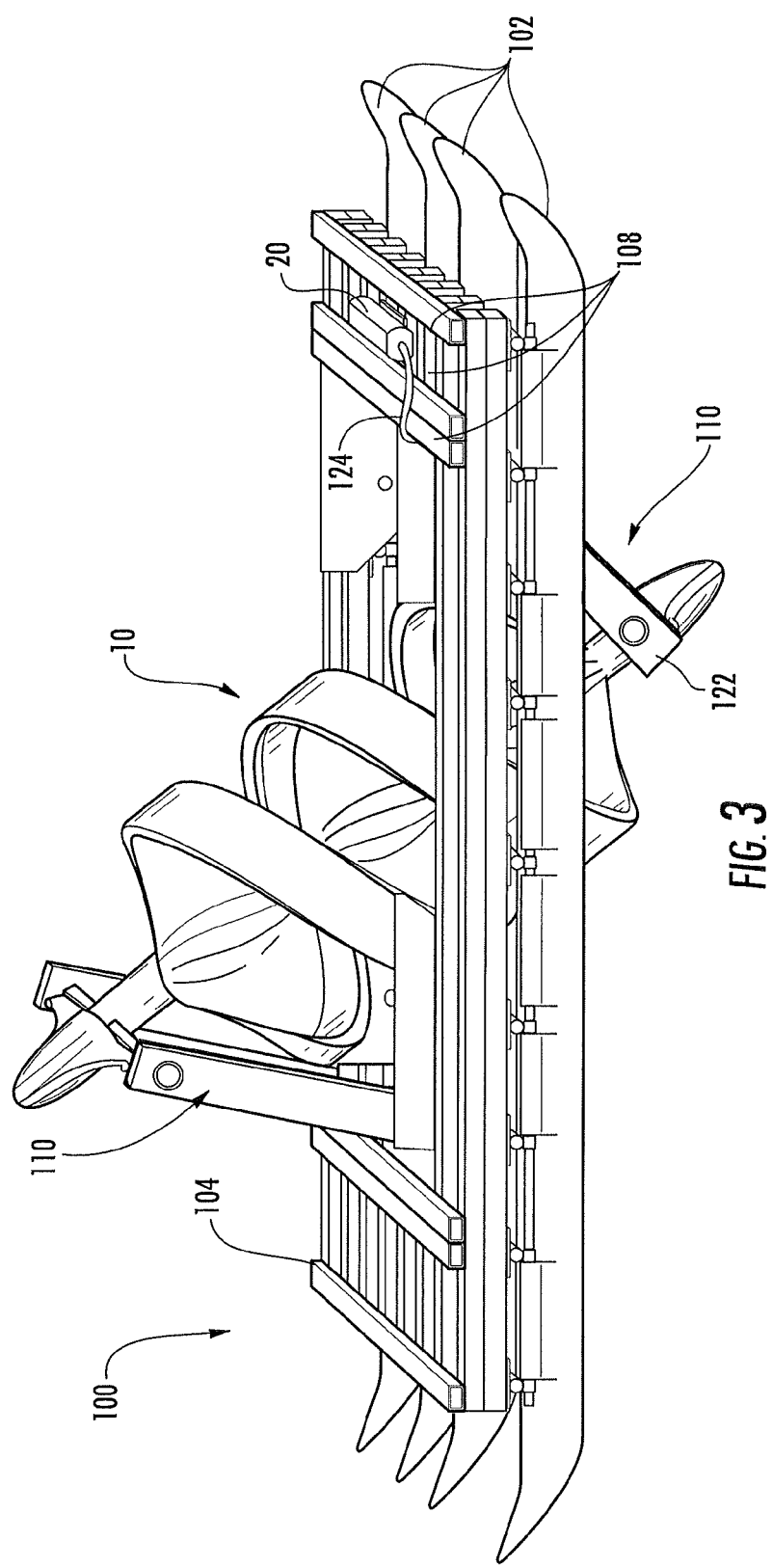
FIG. 3 is a perspective view of the deployment system of FIG. 2 during a deployment maneuver.
Figure 4:
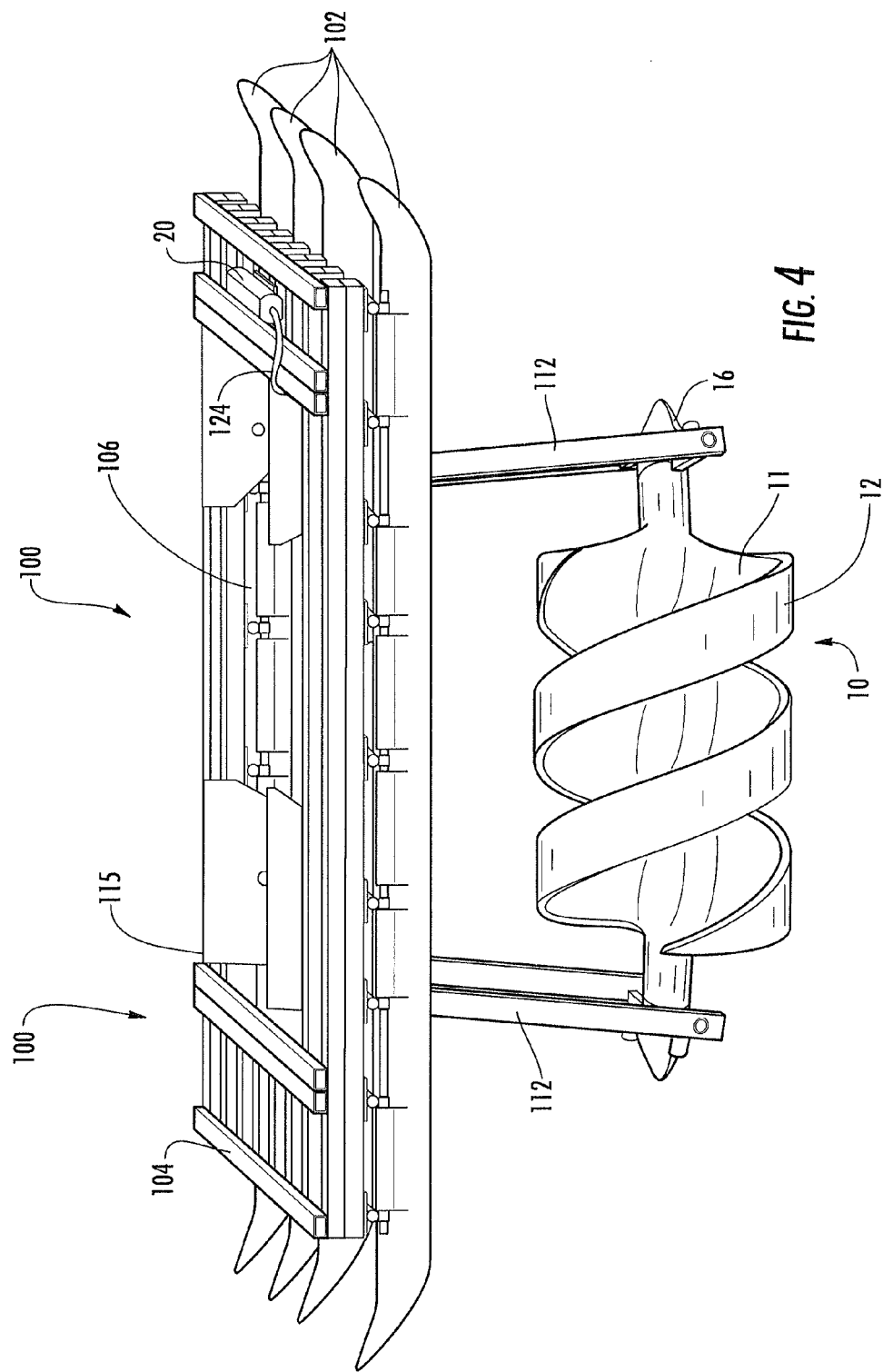
FIG. 4 is a side view of the deployment system of FIG. 2 in the operating position.
Figure 5:
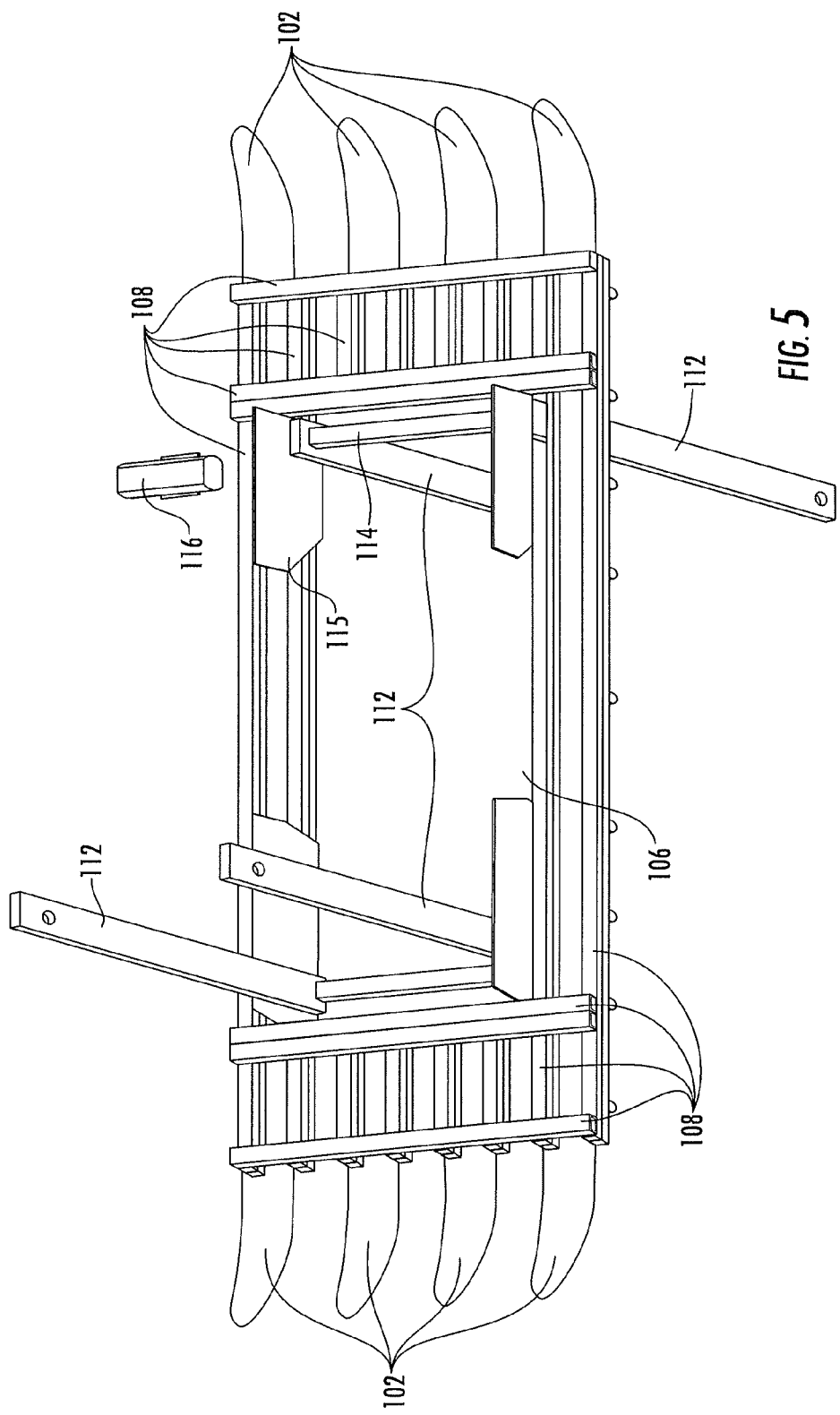
FIG. 5 is a top view of the deployment system.
Figure 6:
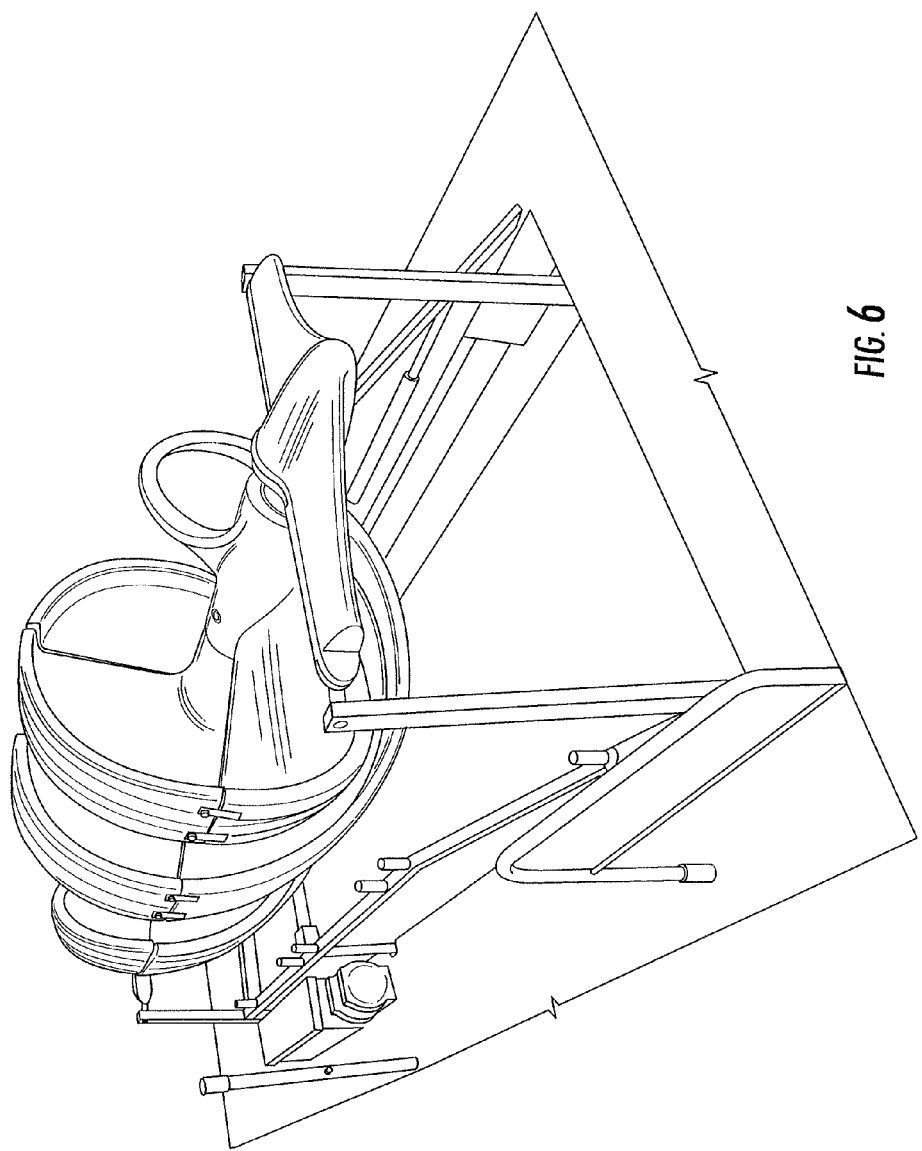
FIG. 6 is a perspective view of an alternative arrangement of a deployment system and attached hydrokinetic turbine.
Figure 7:
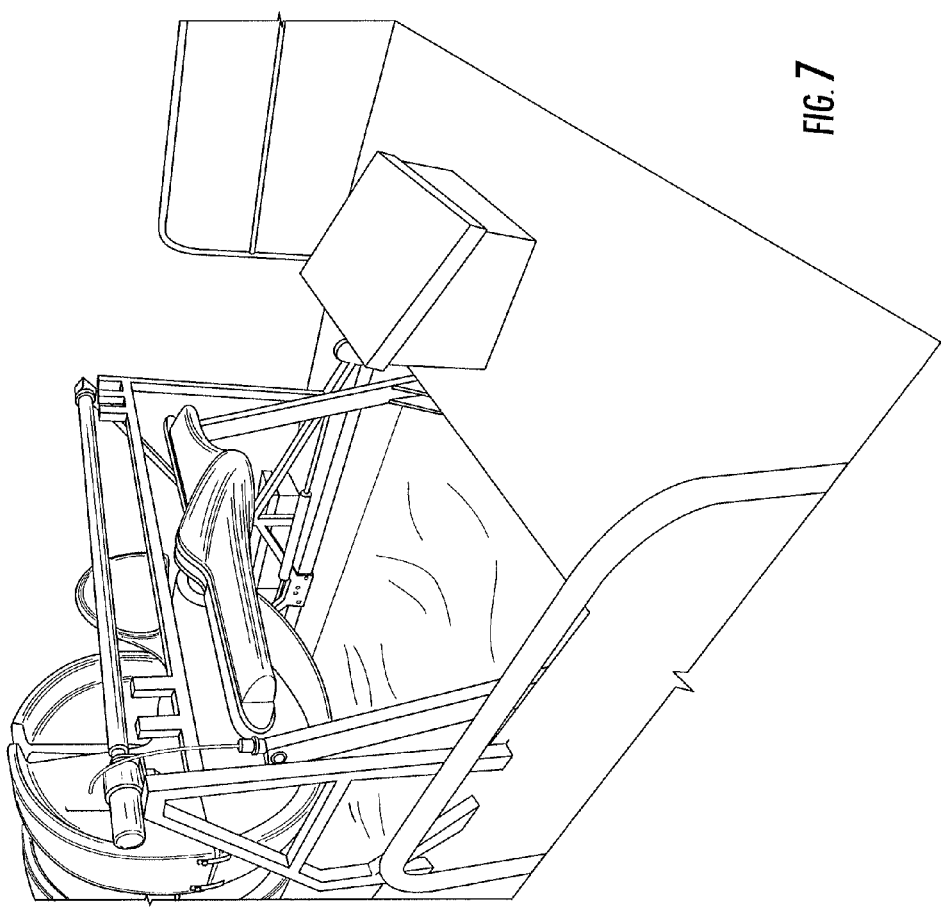
FIG. 7 is a perspective view of an end of the deployment system of FIG. 6.
Figure 8:
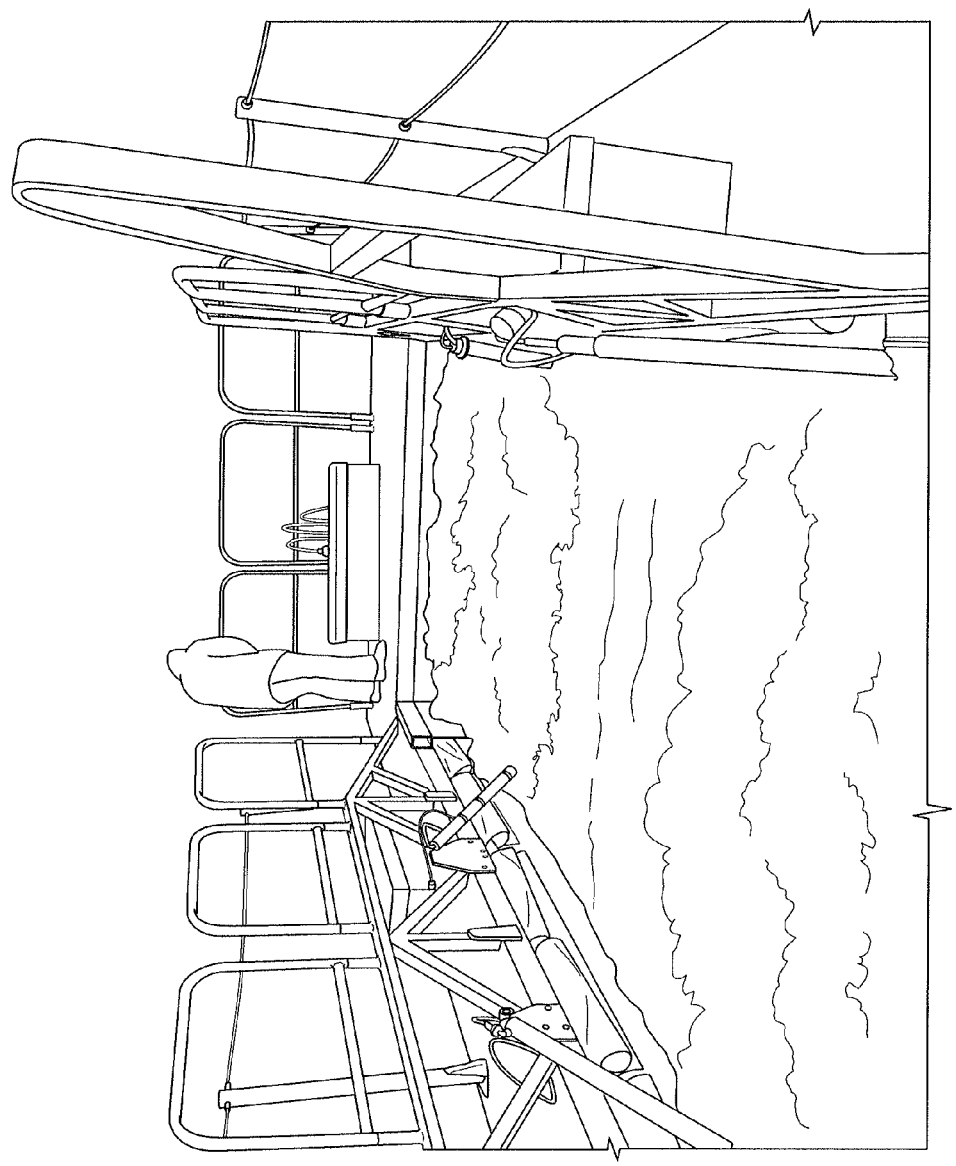
FIG. 8 is a perspective view of the deployment system of FIG. 6 during travel.
Figure 9:
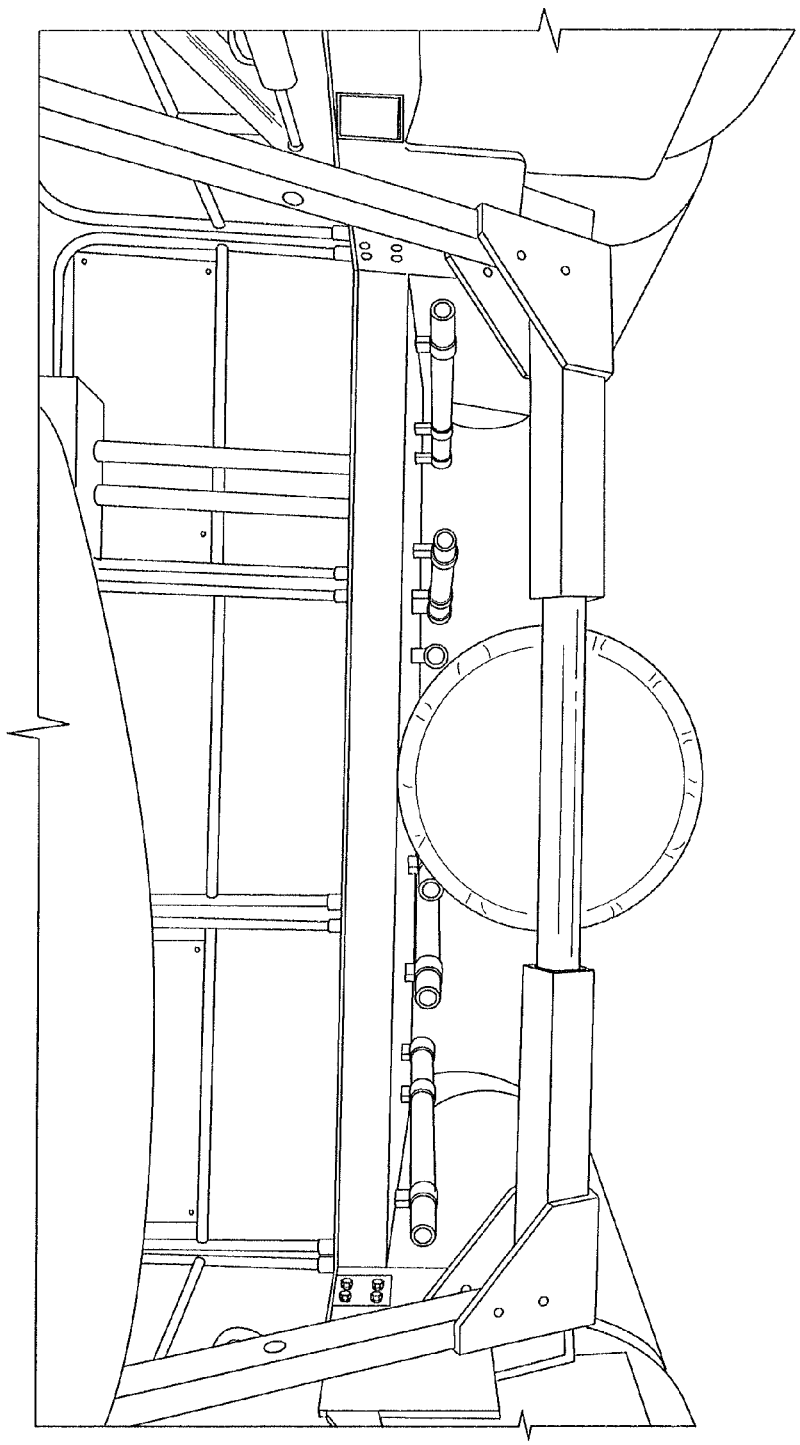
FIG. 9 is a perspective view of an underside of the deployment system of FIG. 6.
Figure 10:
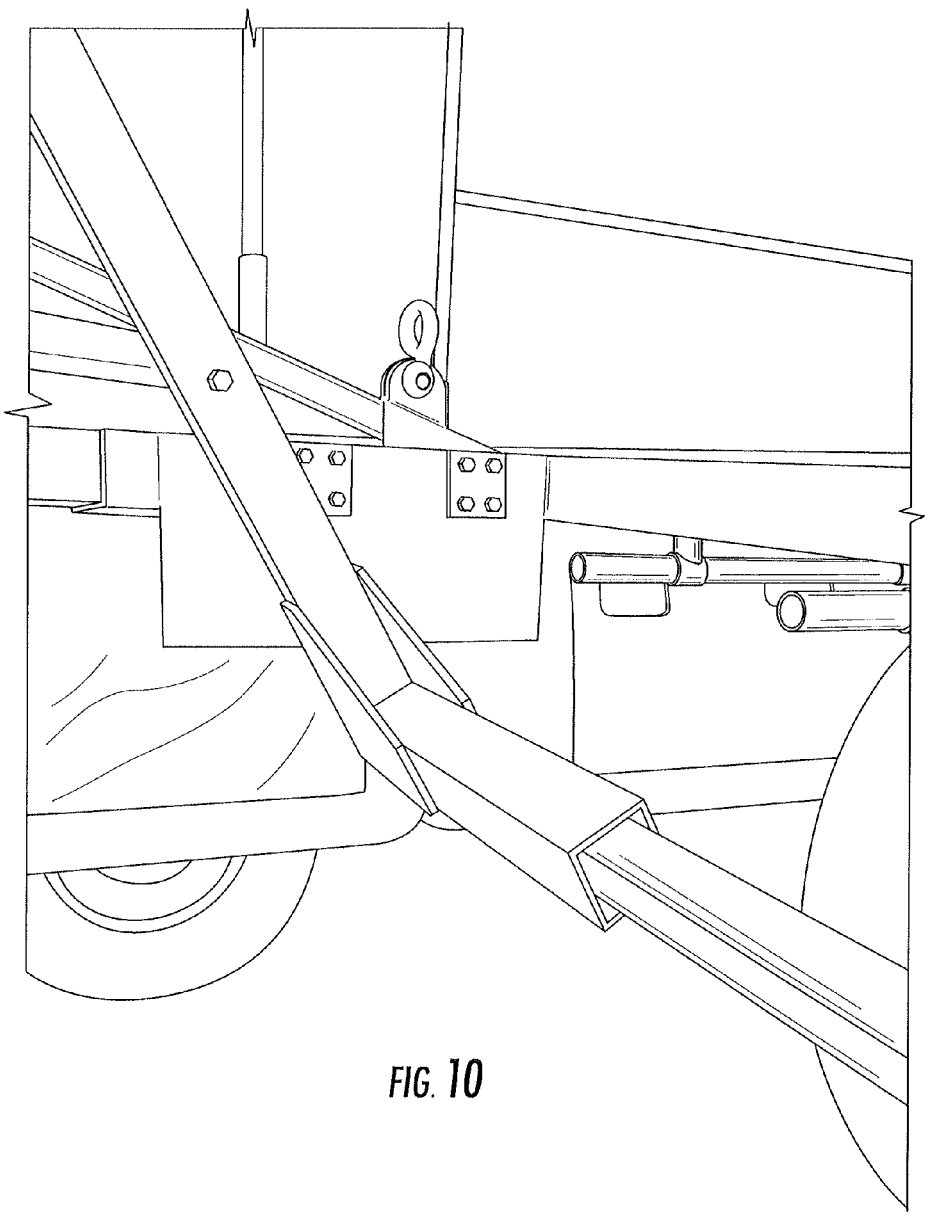
FIG. 10 is a perspective view of an underside of the deployment system of FIGS. 6.

Referring to FIG. 1, an exemplary turbine 10 is shown. The turbine 10 is preferably formed of a lightweight material, such as rotationally molded plastics or molded carbon fiber. It will be appreciated that any suitable material may be used. Reinforcing structures, such as metal ribbing, may be included internally in the turbine blade. In order to aid buoyancy, the turbine may be hollow, or can include air pockets or other buoyancy aids. In a preferred arrangement, the turbine 10 comprises a helical turbine blade 11 provided with a flange 12 at the edge of the blade. The flange 12 is arranged generally perpendicularly to the helical turbine blade 11. In a preferred arrangement, the edges of the flange 12 are smoothly curved, and the turbine blade may also have a gently curved center.

At each end of the turbine blade 11, a tapered terminal section 13 is provided. In the tapered section 13, the diameter of the turbine blade 11 is gradually and smoothly reduced so that it is tapered into a central shaft 14. No flange is provided at the edge of the tapered terminal section 13, and in a preferred arrangement, ends of the flange 12 leading into the tapered sections 13 are reduced in diameter, to prevent the formation of a sharp edge to the flange that could damage marine life. The tapered sections 13 help to reduce damage to marine life that may come into contact with the turbine 10 from either direction, by providing a tapered lead in. A tapered shape is also more tolerant of water-borne or floating debris, and is less likely to suffer damage therefrom.

The helical turbine blade 11 preferably has a 45° pitch, although it will be appreciated that any suitable pitch may be used. The turbine can be supplied in sections of 45° arc or 90° arc that can be assembled together and locked onto the central shaft 14, producing a smooth helical spiral. This permits assembly of the turbine 10 on site to suit the intended application and desired size of the energy capturing zone. Typically, a completed turbine 10 will have 360° of arc, but of course more or fewer turns of the helix may be used in different applications by adding fewer or more sections.

The turbine 10 is designed to rotate relatively slowly with the tidal flow, and the large size and smoothly curved edges allow marine life such as fish to safely move around the blade without becoming trapped or injured. The flange 12 allows the turbine to capture water flows coming from various directions to help turn the turbine 10 even with a slow flow of water or if the flow comes from a non-ideal direction.

The central shaft 14 of the turbine 10 can be hollow, through which an axle shaft can extend. With a 16' diameter turbine, the shaft 14 can have a diameter of 18" although of course any suitable size can be employed. The axle shaft can be connected at either end to one or more nose cones 16, and allows the turbine 10 to rotate on bearings. The nose cones 16 can be connected by mooring cables to anchors (not shown) that can anchor the turbine 10 to the seabed or to joints tethered to an oil rig leg or other securing structure. The nose cones 16 can be provided adjacent to the tapered terminal sections 13 where the diameter of the turbine 10 is reduced, in order to prevent pinch points between the turbine and nose cone 16. The nose cones 16 may be configured to include wing-shaped arms 18. The nose cones 16 may be orientated such that a first longitudinal axis of a first nose cone is axially offset from a second longitudinal axis of a second nose cone. The nose cones 16 may be adapted to maintain an orientation of the turbine 10 parallel to a fluid flow direction, if the turbine is mounted to allow such movement. The nose cones may be axially offset between approximately 15 degrees and approximately 60 degrees with respect to one another. Preferably, the first and second nose cones may be axially offset approximately 30 degrees with respect to one another. Other configurations and dimensions may be used.

The turbines 10 can be anchored in any suitable manner (such as by cables, tether, fasteners, etc.) to any suitable support structure, such as a leg of an oil rig, or a bridge support. A plurality of turbines can be distributed in any suitable manner in one installation. The turbines can be submerged at a sufficient depth in a body of water so that they are away from floating debris, trees, logs, ice, etc. In some arrangements, the turbines 10 can be tethered in place at depths of approximately 8'-10' below the lowest tides, to avoid floating debris. The turbines 10 can be oriented generally horizontally, and can be oriented with their central shaft 14 approximately parallel to the tidal or river flow for maximum energy capture. The turbines can be adapted to allow for changes in the vertical level of the water in which they are submerged, and can capture tidal flow without horizontal orientation as other tidal generators must do to always be in the same direction with respect to the water flow. To that end, each turbine 10 can include horizontal stabilizers with computer controlled ailerons to hold the turbine horizontal and parallel to the tidal flow.

The rotation of the turbines can be transmitted to power a hydraulic generator 20, which can include an oil-based hydraulic accumulator and an electric generator. During high flow periods, water flow will turn the turbine 10. The rotation of the turbine can be transmitted to operate the pump, which, in turn, will store hydraulic energy in the accumulator. During low flow periods, the stored energy in the accumulator can be released to continue the steady operation of the electric generator.

The helical turbine blade may be manufactured in sections. Each section may be manufactured to be substantially similar and may have a 45 degree pitch or any other suitable pitch. Each section may be manufactured to have a radial arc of approximately 15, 20, 30, 45, 60, 90, 120, 135, 180, or other degrees. Each section may be manufactured to have a cylindrical center piece that may be slid onto either a stationary or rotating central shaft during assembly.

The sections may be assembled together and locked onto the central shaft 14, producing a smooth helical spiral. The individual sections may permit shipping in pieces, followed by assembly of the turbine 10 on-site to suit the intended application and desired size of the energy capturing zone. Typically, a completed turbine 10 will have 360 degrees of arc, but more or fewer turns of the helix may be used in different applications by adding fewer or more sections.

A shipping and manufacturing method may include shipping the individual sections to a remote location. In one embodiment, the interior and exterior sections may have a diameter of eight feet or more, and the fully assembled turbine may have a length of 20 feet or longer. Thus, the size of the fully assembled turbine may hinder transportation. However, manufacturing the turbine in sections may facilitate the shipment of individual interior and exterior sections, as well as generator and other components, to locations around the world, and their subsequent assembly on-site.

The turbine 10 may be either directly or indirectly interconnected with a generator such that the rotation of the central shaft and/or the helical turbine by the moving fluid generates energy. For instance, the interior sections may be firmly fastened to a rotating central shaft, such as via bolts or screws. The two ends of the central shaft may drive or be interconnected with a generator. In one embodiment, the two ends of the central shaft may be interconnected with generator rotors that rotate as the central shaft and/or the helical multi-piece turbine rotates. The generator rotors may interact with stationary stators to generate power. Alternatively, the interior sections may be rotatably mounted onto the central shaft and the interconnected interior (and/or exterior) sections (i.e., the fully assembled helical multi-piece turbine) may be interconnected with or drive an electrical generator or components thereof. Other configurations to generate energy from the rotation of a rotatable central shaft or the fully assembled helical multi-piece turbine around a stationary central shaft may be used to generate power.

In some arrangements, a planetary gearing system may be provided inside of the nose cone 16 or another part of the turbine or in the generator assembly 20 to increase the relatively low speed or revolutions per minute (rpm) of the turbine to a level that can be efficiently used to power a hydraulic pump. The hydraulic pump may be in fluid communication with an air-fluid accumulator, and may be bi-directional to maintain a constant high pressure of hydraulic oil, or other fluid, at all speeds of turbine rotation irrespective of whether the turbine is accelerating or decelerating, or reversing during the cyclic tidal flow.

The nose cone assembly 16 may be configured to house a portion of a hydraulic system, including various hydraulic fittings and high pressure hoses. For instance, the nose cone assembly may house hydraulic supply and return lines, and two 90 degree bulkhead fittings. The hydraulic supply and return lines may be placed on each side of an interior stiffener that strengthens and supports the nose cone assembly.

The nose cone assembly 16 may also include a tethering line that maintains the position of the turbine with respect to the water line. The tethering line may be attached to a nose cone backing plate that also strengthens and supports the nose cone assembly. The hydraulic supply and return lines may also be attached to the tethering line.

Each turbine may include one or more hydraulic pumps. Each hydraulic pump may be housed within the nose cone assembly and be configured such that the pump is powered by the rotation of the turbine/central shaft during use. Each hydraulic pump may include two straight male or other hydraulic fittings that are configured to attach to a hydraulic supply and/or return line. Two high pressure hydraulic hoses with female fittings on both ends may operate as the supply and return lines. The hydraulic hoses may be attached to fittings associated with or in the vicinity of the hydraulic pump, at one end, and the inside ends of 90 degree bulkhead fittings, on the other end.

A left and right interior stiffener may be housed within the body of the nose cone assembly. Each stiffener may include a plate with a dove tail two-piece assembly. An end plate may be attached to the nose cone back plate. The end plate may cover and/or support the 90 degree bulkhead fittings and/or interconnected hydraulic lines. An outer end piece may be configured with openings for the hydraulic lines such that the outer end piece can cover the end plate, the 90 degree bulkhead fittings, and the interconnected hydraulic lines after the hydraulic system is interconnected, and provide a smooth exterior for the end of the nose cone assembly. Other configurations may be used.

An exemplary deployment system and method for a turbine is disclosed. Referring to FIGS. 2-5, a turbine 10 is mounted on a floatable platform 100. In the illustrated arrangement, the floatable platform 100 includes several pontoons 102 topped with a platform structure 104. A central aperture 106 is provided through the platform structure 104 and the pontoons 102.

All the components of the deployment system can be sized to be transportable to a launch location. For example, the components may be sized to fit in a standard shipping container, or in any suitable size of transport vehicle, depending on the needs of the particular installation. Thus, the platform structure 104 may be provided in frame sections 108 that can be connected together onsite prior to launch into the water using any suitable connecting mechanisms. The pontoons 102 may have individual lengths that are suitable for transporting in a vehicle, and can be connected to the platform structure 104 in any combination to create the desired setup of the floatable platform 100. The pontoons 102 may be formed of rigid plastic enclosing an air space, or may be formed of flexible plastic that can be inflated onsite, and may be transported to the site attached to the platform structure 104 sections 108, or unattached to the platform structure 104. If the pontoons 102 are not attached to the platform structure sections 108 for transport, additional securement devices can be provided so that the floatable platform 100 can be assembled onsite. Alternatively, the floatable platform 100 may be pre-assembled and transported to the site in one piece.

The mounting of the turbine 10 to the floatable platform 100 includes a pair of arms 110 attachable to the platform structure 104 at ends of the central aperture 106. In the illustrated arrangement, each arm 110 includes two arm members 112, so that the turbine is supportable between two members. Other arrangements are possible—for example, a single arm 110 may be provided, or the arm 110 may bifurcate at a point along its length to provide a support connection for the turbine. Each arm member 112 may be connected to an axle 114, which is drivable by a motor or motors 116, such that the arm members 112 are rotatable. In another arrangement (now shown), a crane or cranes may be mounted to the floatable platform 100 or moved alongside the platform 100 on a boat to raise or lower the arms 110. Alternatively, the lowering of the arms 110 can be powered by motors 116, and the raising of the arms 110 can be accomplished by a crane.

Typically, the axles 114 span ends of the central aperture 106, and are supported between support brackets 115. The support brackets 115, and hence the axles 114, can be set inwardly a short distance from the ends of the aperture 106 to allow the arms 110 to be rotated beyond a vertical position. The support brackets 115 can include stops to prevent over-rotation of the arm members 112 beyond a desired rotation amount. The arm members 112 may be connected together with a strut 118, so that they remain parallel to each other during the rotational movement of the arms 110. The arm members 112 are made of a rigid material so that they can bear the weight of the turbine 10 as the turbine 10 is moved into position. The strut 118 includes an attachment mechanism for attaching the turbine 10 thereto.

The strut 118 can comprise a first beam connected to one of the arm members 112, and a second beam connected to the other of the arm members, such that a gap is provided between the first and second beams. A nose cone 16 of a turbine 10 is positionable at least partially in the gap between the first and second beams such that at least a portion of the nose cone 16 is attachable to the first beam and at least a portion of the nose cone 16 is attachable to the second beam. Support brackets 122 can be provided to pivotably support the struts 118 on the arms 110, such that the turbine 10 supported by the arms 110 can pivot as the arms are moved. Additionally, removable retention members that can temporarily hold the arms 110 in position relative to one another, either for transport or for part or all of the deployment maneuver, can be connected to brackets 122. The retention members can, for example, be formed of an elastic material and can extend from one arm 110 to the opposite arm 110.

FIGS. 6-10 show an alternative arrangement of arms in a deployment system. In this arrangement, the arms can be moved using a crane and pulley system.

In order to deploy a turbine 10, the turbine is initially mounted above the platform 102, with the arms 110 positioned nearly vertically upwards. The arms 110 will typically extend towards one another slightly as the length of the turbine 10 is less than the distance between the axles 114 that support the arms. Thus, if a vertical upright position of the arm is defined such that hanging vertically downwards is 0° and vertically upright is 180°, with the range of angles from 0 to 180 being those that face inwardly towards the aperture 106, typically the arms 110 will be positioned at approximately 170° to support the turbine 10 above the platform 102. It should be appreciated that the exact angles will depend on the exact relative measurements of the lengths of the arms 110, the turbine 10, the aperture 106 and the location of the axles 114, and will vary. Angles are given throughout this specification as rough illustrative examples only.

In order for the deployment movement to take place successfully, the dimensions of the arms 110 in relation to the length of the aperture 106 should be carefully planned in advance so that there is no interference between the platform 100 and the movement of the arms 110 and the supported turbine 10. For example, for a turbine 10 that is 12 feet long, the aperture 106 can measure 18' long, with the axles 114 placed approximately 1.5' in from each end of the aperture. The arms 110 can in this instance be approximately 4' long.

Once the platform 102 has been floated into the desired position for deployment of the turbine, the arms 110 are rotated individually to move from a position supporting the turbine 10 above the platform to a position that is hanging below the platform. Again, as the turbine 10 itself is shorter than the distance between the axles 114 supporting the arms, in the position where the turbine 10 is supported underneath the platform, the arms 110 are at an angle of approximately 10° off from vertical.

The movement is such that the arms 110 are first moved towards one end of the aperture 106 so that the turbine 10 is offset towards and slightly over that end of the aperture 106. In this position, the leading, or first, arm 110 at that end of the aperture 106 has been moved from approximately 170° to a position beyond vertical, such as approximately 195°. This allows the second, following, arm 110 to move inwardly towards the aperture 106 to, for example, approximately 145°. The pivoting of struts 118 in brackets 122 allows the second arm to continue the movement and to fall to approximately 135°, at which point the second arm is longitudinally aligned with the turbine 10. The second arm 110 continues to fall downwardly, enters the water with its end of the turbine 10, and takes over as the leading arm in the movement. This pulls the first arm 110 that is still above the water back through the vertical upright position and inwardly towards the aperture 106. As the second arm that is under the water swings beyond the vertical downwards position of 0° to approximately 345°, the first arm is pulled to a position at approximately 135° that is longitudinally aligned with the turbine 10. The pivoting of the struts 118 allows for the weight of the first arm 110 to swing further downwards, to come to rest at approximately 10°, pulling the second arm to a position also at approximately 10°, with the turbine 10 positioned beneath the aperture 106.

A processor and memory can be provided (not shown) and can be connected to the motor or motors 116, to drive the rotational movement of the arms 110 through a pre-determined sequence to ensure that the turbine 10 can be safely lowered through the aperture 106. Each arm 110 can be driven separately from the other arm 110, although in one arrangement the arms 110 can be driven in a synchronized program to ensure that the turbine 10 is lowered through the aperture appropriately. In another arrangement, only one arm 110 is driven, with the other arm being moved due to the force applied on the non-driven arm 110 by stretching of elastic retention members. In yet another arrangement, at least a part of the movement can be carried out by a crane.

At least one of the arm members 112 of at least one of the deployment swing member arms 110 includes a conduit 124 for receiving a pipe or cable capable of connecting the hydrokinetic turbine 10 to a hydrokinetic generator 20.

The deployment system may be left in place permanently once the turbine 10 has been transported to its desired location, in which case the hydrokinetic generator 20 can be provided on the platform structure. Alternatively, the deployment system may be used only temporarily for transport of the turbine to its desired location. If the deployment system is used for transport only, once the turbine 10 has been delivered, the conduit 124 can be connected to a generator 20 provided on a permanent platform. Divers can disconnect the turbine 10 from the arms 110, and can connect the turbine 10 to appropriate mooring supports. The arms 110 can be rotated back to an upright position above the platform 100, and the floatable platform 100 can then be transported back to shore for dismantling.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A deployment device for a hydrokinetic energy converter comprising:

a floatable platform including a central aperture sized to allow a hydrokinetic turbine to be lowered therethrough into water; and a pair of deployment swing members rotatably attached to the platform and located adjacent to the central aperture, wherein each deployment swing member comprises a support for connection to an end of a hydrokinetic turbine, such that the turbine is supported between the deployment swing members, wherein each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water, and wherein each deployment swing member comprises two arms, and wherein the support for connection to the hydrokinetic turbine is connected between the two arms.

2. The deployment device according to claim 1, wherein the floatable platform includes an inflatable buoyancy structure.

3. The deployment device according to claim 1, wherein the floatable platform includes a removable buoyancy structure.

4. The deployment device according to claim 1, wherein the floatable platform is attachable to or provided as part of a boat.

5. The deployment device according to claim 1, wherein each deployment swing member is rotatable independent of the other deployment swing member.

6. The deployment device according to claim 1, further comprising processing means and at least one motor or hydraulic to rotate the deployment swing members, wherein the processing means include at least one program for moving first one deployment swing member from the first position, through the central aperture to the second position, and then the other deployment swing member fully from the first position, through the central aperture to the second position.

7. The deployment device according to claim 1, wherein the support for connection to the hydrokinetic turbine comprises a first beam connected to one of said arms, and a second beam connected to the other of said arms, such that a gap is provided between the first and second beams, wherein a nose cone of a hydrokinetic turbine is positionable at least partially in the gap between the first and second beams, and wherein at least a portion of the nose cone is attachable to the first beam and at least a portion of the nose cone is attachable to the second beam.

8. The deployment device according to claim 1, wherein at least one of the arms of at least one of the deployment swing members includes a conduit for receiving a pipe or cable capable of connecting the hydrokinetic turbine to a hydrokinetic generator.

9. The deployment device according to claim 1, further comprising a hydrokinetic generator provided on the floatable platform and connectable to the hydrokinetic turbine.

10. The deployment device according to claim 1, wherein the deployment swing members are rigid.

11. The deployment device according to claim 1, further including support brackets attached to the floatable platform for rotatably supporting the deployment swing arms.

12. The deployment device according to claim 11, wherein the support brackets include stops to prevent outward rotation of the deployment swing arms beyond the first and second positions.

13. The deployment device according to claim 11, wherein the support brackets support axles therebetween for rotatably supporting the deployment swing arms.

14. A method of deploying a hydrokinetic energy converter comprising the steps of:
providing a floatable platform including a central aperture sized to allow a hydrokinetic turbine to be lowered therethrough into water;

rotatably attaching a pair of deployment swing members, each comprising two arms, to the platform, wherein the deployment swing members are located adjacent to ends of the central aperture;

supporting a hydrokinetic turbine between the deployment swing members on supports provided on each deployment swing member, the hydrokinetic turbine being supported in a generally horizontal position, and wherein the supports are connected between the two arms of each deployment swing member;

positioning the floatable platform at a deployment location;

rotating a first of the deployment swing members from a first position in which the swing member and the attached hydrokinetic turbine are raised out of the water, through the central aperture, and to a second position in which the swing member and the attached hydrokinetic turbine are lowered beneath the platform at least partially in the water; and rotating the second of the deployment swing members from a first position in which the swing member and the attached hydrokinetic turbine are raised at least partially out of the water, through the central aperture, and to a second position in which the swing member and the attached hydrokinetic turbine are lowered beneath the platform in the water in a generally horizontal position.

15. A deployment device for a hydrokinetic energy converter comprising:
a floatable platform including a central aperture sized to allow a hydrokinetic turbine to be lowered therethrough into water;

a pair of deployment swing members rotatably attached to the platform and located adjacent to the central aperture, wherein each deployment swing member comprises a support for connection to an end of a hydrokinetic turbine, such that the turbine is supported between the deployment swing members, wherein each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water; and a processing means and at least one motor or hydraulic to rotate the deployment swing members, wherein the processing means include at least one program for moving first one deployment swing member from the first position, through the central aperture to the second position, and then the other deployment swing member fully from the first position, through the central aperture to the second position.

16. A deployment device for a hydrokinetic energy converter comprising:
a floatable platform including a central aperture sized to allow a hydrokinetic turbine to be lowered therethrough into water; and a pair of deployment swing members rotatably attached to the platform and located adjacent to the central aperture, wherein each deployment swing member comprises a support for connection to an end of a hydrokinetic turbine, such that the turbine is supported between the deployment swing members, wherein each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water, and wherein at least one of the arms of at least one of the deployment swing members includes a conduit for receiving a pipe or cable capable of connecting the hydrokinetic turbine to a hydrokinetic generator.

17. A deployment device for a hydrokinetic energy converter comprising:

a floatable platform including a central aperture sized to allow a hydrokinetic turbine to be lowered therethrough into water; and a first and a second deployment swing member rotatably attached to the platform and located adjacent to the central aperture, the first deployment swing member comprising a first arm and a second arm to rotatably couple to a first end of the hydrokinetic turbine, and the second deployment swing member comprising a first arm and a second arm to rotatably couple to a second end of the hydrokinetic turbine, wherein the first arms of the first and second deployment swing members are positioned to rotatably couple to the hydrokinetic turbine along a first side of the hydrokinetic turbine and the second arms of the first and second deployment swing members are positioned to rotatably couple to the hydrokinetic turbine along a second side of the hydrokinetic turbine such that the turbine is supported at the first end and the second end between the deployment swing members, and wherein each deployment swing member is rotatably supported for rotating the swing members from a first position in which the swing member and any attached turbine are raised at least partially out of the water, through the central aperture, and to a second position in which the swing member and any attached turbine are lowered beneath the platform at least partially in the water.

* * * * *